United States Patent
Chung et al.

(10) Patent No.: US 9,406,937 B2
(45) Date of Patent: Aug. 2, 2016

(54) BINDER COMPOSITION FOR RECHARGEABLE LITHIUM BATTERY, PREPARING METHOD OF SAME, AND RECHARGEABLE LITHIUM BATTERY INCLUDING BINDER COMPOSITION

(71) Applicants: SAMSUNG SDI CO., LTD., Yongin-si, Gyeonggi-do (KR); AEKYUNG CHEMICAL CO., LTD, Seoul (KR)

(72) Inventors: Byung-Joo Chung, Yongin-si (KR); Eon-Mi Lee, Yongin-si (KR); Seung-Uk Kwon, Yongin-si (KR); Jae-Hyuk Kim, Yongin-si (KR); Soon-Sung Suh, Yongin-si (KR); Chang-Ui Jeong, Yongin-si (KR); Ha-Na Yoo, Yongin-si (KR); Nam-Seon Kim, Yongin-si (KR); Yang-Soo Kim, Yongin-si (KR); Kwang-Sik Choi, Yongin-si (KR)

(73) Assignee: AEKYUNG CHEMICAL CO., LTD., Seoul (KR)

( * ) Notice: Subject to any disclaimer, the term of this patent is extended or adjusted under 35 U.S.C. 154(b) by 114 days.

(21) Appl. No.: 14/139,344

(22) Filed: Dec. 23, 2013

(65) Prior Publication Data
US 2015/0010816 A1 Jan. 8, 2015

(30) Foreign Application Priority Data
Jul. 8, 2013 (KR) .................. 10-2013-0079844

(51) Int. Cl.
*H01M 4/62* (2006.01)
*H01M 4/587* (2010.01)
(Continued)

(52) U.S. Cl.
CPC .................. *H01M 4/622* (2013.01); *C08F 8/30* (2013.01); *C08L 51/00* (2013.01); *H01M 4/133* (2013.01);
(Continued)

(58) Field of Classification Search
CPC ........ C08F 222/06; C08F 20/56; C08L 33/26; C08L 23/00; C08L 35/00
USPC ................................................. 525/201, 218
See application file for complete search history.

(56) References Cited

U.S. PATENT DOCUMENTS

| 7,527,858 B2 | 5/2009 | Lundquist |
| 7,875,388 B2 | 1/2011 | Le |

(Continued)

FOREIGN PATENT DOCUMENTS

| GB | 2487569 A | 8/2012 |
| JP | 2010-116475 | 5/2010 |

(Continued)

OTHER PUBLICATIONS

E. Sauvage et al., Amphiphilic Maleic Acid-Containing Alternating Copolymers, etc., Journal of Polymer Science, Part B Polymer Physics, vol. 42, pp. 3571-3583 (2004).
(Continued)

*Primary Examiner* — Vu A Nguyen
(74) *Attorney, Agent, or Firm* — Lee & Morse, P.C.

(57) ABSTRACT

A binder composition for a rechargeable lithium battery includes a semi-interpenetrating polymer network (semi-IPN) including a copolymer including a repeating unit represented by the following Chemical Formula 1 and a repeating unit represented by the following Chemical Formula 2 and polyacrylamide, and polyalkylene glycol.

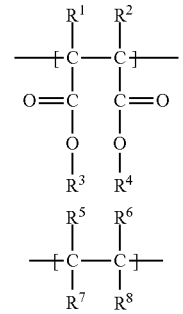

[Chemical Formula 1]
[Chemical Formula 2]

In Chemical Formula 1, $R^1$ and $R^2$ are the same or different and are independently selected from hydrogen, or a substituted or unsubstituted C1 to C10 alkyl group, and $R^3$ and $R^4$ are an alkali metal. In Chemical Formula 2, $R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

21 Claims, 3 Drawing Sheets

(51) Int. Cl.
  *H01M 4/133* (2010.01)
  *H01M 10/052* (2010.01)
  *H01M 4/134* (2010.01)
  *H01M 4/38* (2006.01)
  *C08F 8/30* (2006.01)
  *H01M 4/36* (2006.01)
  *C08L 51/00* (2006.01)
  *H01M 10/0525* (2010.01)
  *H01M 4/02* (2006.01)

(52) U.S. Cl.
  CPC .............. *H01M 4/134* (2013.01); *H01M 4/364* (2013.01); *H01M 4/386* (2013.01); *H01M 4/587* (2013.01); *H01M 10/052* (2013.01); *H01M 10/0525* (2013.01); *C08L 2205/04* (2013.01); *H01M 2004/021* (2013.01); *Y02E 60/122* (2013.01)

(56) References Cited

U.S. PATENT DOCUMENTS

| | | | |
|---|---|---|---|
| 7,960,056 | B2 | 6/2011 | Yang et al. |
| 8,236,412 | B2 | 8/2012 | Jousset et al. |

FOREIGN PATENT DOCUMENTS

| | | |
|---|---|---|
| KR | 10-2007-0037686 | 4/2007 |
| KR | 10-2008-0017113 | 2/2008 |
| KR | 10-2011-0008287 | 1/2011 |

OTHER PUBLICATIONS

Enichem S.P.A. Water-Absorbent Polymers: A Patent Survey, JMS Rev. Macromol. Chem. Phys., C34(4), 607-662 (1994).

BINDER COMPOSITION FOR RECHARGEABLE LITHIUM BATTERY, PREPARING METHOD OF SAME, AND RECHARGEABLE LITHIUM BATTERY INCLUDING BINDER COMPOSITION

CROSS-REFERENCE TO RELATED APPLICATION

Korean Patent Application No. 10-2013-0079844, filed on Jul. 8, 2013, in the Korean Intellectual Property Office, and entitled: "Binder Composition For Rechargeable Lithium Battery, Preparing Method Of Same, and Rechargeable Lithium Battery Including Binder Composition," is incorporated by reference herein in its entirety.

BACKGROUND

1. Field

Embodiments are directed to a binder composition for a rechargeable lithium battery, a method of preparing the same, and a rechargeable lithium battery including the same.

2. Description of the Related Art

A rechargeable lithium battery includes positive and negative electrodes including a material that can reversibly intercalate/deintercalate lithium ions as positive and negative active materials and an organic electrolyte solution or a polymer electrolyte solution charged between the positive and negative electrodes. The positive and negative electrodes intercalate and deintercalate lithium ions and produce electrical energy through oxidation and reduction reactions.

As for a positive active material for a lithium rechargeable battery, a lithium-transition metal oxide being capable of intercalating lithium such as $LiCoO_2$, $LiMn_2O_4$, $LiNi_{1-x}Co_xO_2$ (0<x<1), and the like has been used.

As for a negative active material for a lithium rechargeable battery, various carbon-based materials such as artificial graphite, natural graphite, and hard carbon capable of intercalating and deintercalating lithium ions have been used.

SUMMARY

Embodiments are directed to a binder composition for a rechargeable lithium battery, the binder composition including a semi-interpenetrating polymer network (semi-IPN) including:

a copolymer having a repeating unit represented by the following Chemical Formula 1 and a repeating unit represented by the following Chemical Formula 2 and polyacrylamide, and polyalkylene glycol:

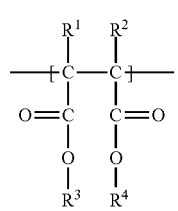

[Chemical Formula 1]

wherein, $R^1$ and $R^2$ are the same or different and are independently selected from hydrogen, or a substituted or unsubstituted C1 to C10 alkyl group, and $R^3$ and $R^4$ are an alkali metal, and

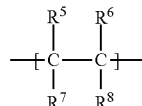

[Chemical Formula 2]

wherein, $R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

The repeating unit represented by the above Chemical Formula 1 may be included in an amount of about 40 mol % to about 90 mol % based on the total amount of the copolymer. The repeating unit represented by the above Chemical Formula 2 may be included in an amount of about 10 mol % to about 60 mol % based on the total amount of the copolymer.

In the semi-interpenetrating polymer network, a mole ratio of the copolymer to the polyacrylamide may range from about 1:9 to about 5:5.

The binder composition may include about 50 mol % to about 95 mol % of the semi-interpenetrating polymer network and about 5 mol % to about 50 mol % of polyalkylene glycol.

A weight-average molecular weight of the polyalkylene glycol may range from about 400 g/mol to about 10,000 g/mol.

The binder composition may further include a free lithium ion ($Li^+$).

The free lithium ion may be included in an amount of about 1 mol % to about 10 mol % based on the sum of the copolymer and the polyacrylamide.

The binder composition may have a pH of about 8 to about 11.

A viscosity of the binder composition may range from about 1,000 cps to about 100,000 cps.

Embodiments are also directed to a rechargeable lithium battery including an electrode including the binder composition, as described above, and an electrode active material, and an electrolyte.

The electrode active material may include a silicon-based compound, graphite, or a combination thereof.

The electrode active material may include about 10 wt % to about 90 wt % of graphite.

A loading level of the electrode may range from about 4.5 $g/cm^2$ to about 10 $g/cm^2$.

Embodiments are also directed to a method of preparing a binder composition for a rechargeable lithium battery, the method including adding a copolymer of at least one monomer selected from an olefin-based monomer, an aromatic vinyl monomer, and an alkyl vinyl ether monomer and a cyclic unsaturated acid anhydride monomer, and polyalkylene glycol to a solvent, adding an alkali metal-containing compound to the resultant solution, and adding an acrylamide monomer to the resultant solution to form polyacrylamide by polymerization and form a semi-interpenetrating network structure of the copolymer and polyacrylamide.

The cyclic unsaturated acid anhydride monomer may be included in an amount of 40 mol % to 90 mol % based on the total amount of the copolymer. The at least one monomer selected from the olefin-based monomer, aromatic vinyl monomer, and alkyl vinyl ether monomer may be included in an amount of about 10 to about 60 mol % based on the total amount of the copolymer.

The polyalkylene glycol may be added in an amount of about 5 mol % to about 50 mol % based on the sum of the copolymer, the polyacrylamide, and polyalkylene glycol.

During adding the alkali metal-containing compound to the solution, the alkali metal-containing compound may be included in an amount of about 28 parts by weight to about 34 parts by weight based on 100 parts by weight of the copolymer.

A mole ratio of the copolymer to the polyacrylamide may range from about 1:9 to about 5:5.

The method may further include, during performing polymerization and forming the semi-interpenetrating network structure after adding the acrylamide monomer to the solution, adding a polymerization initiator to the solution.

The method may further include, after forming the semi-interpenetrating network structure, adding a lithium-containing compound.

During adding the lithium-containing compound, the lithium-containing compound may be added such that a content of a lithium ion is about 1 mol % to about 10 mol % based on the sum of the copolymer and the polyacrylamide.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
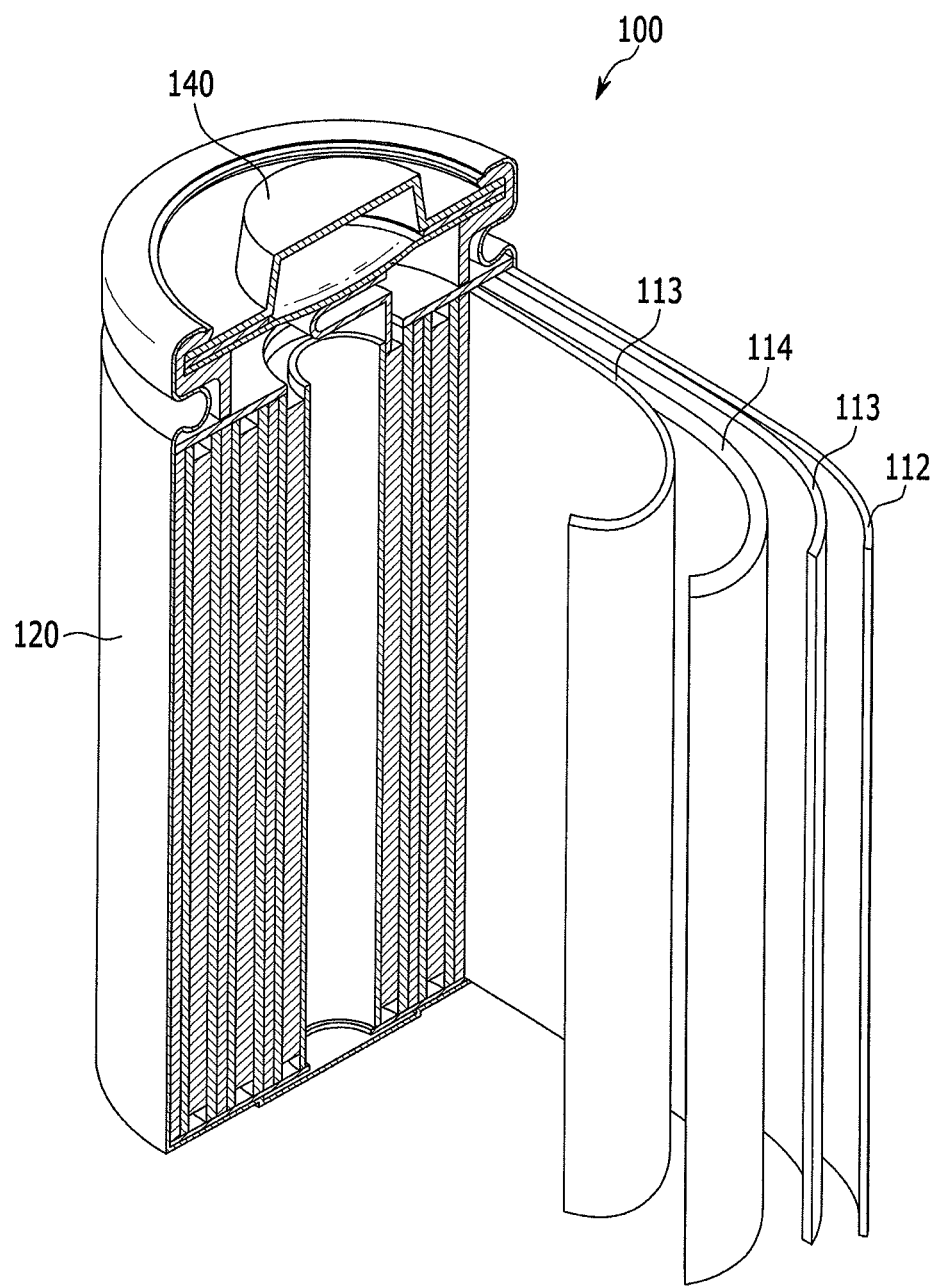
FIG. 1 illustrates a schematic view showing a structure of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

As used herein, when a definition is not otherwise provided, the term "substituted" may refer to substitution with a C1 to C30 alkyl group; a C2 to C30 alkenyl group, a C2 to C30 alkynyl group, a C1 to C10 alkylsilyl group; a C3 to C30 cycloalkyl group; C6 to C30 aryl group; a C1 to C30 heteroaryl group; or a C1 to C10 alkoxy group, instead of at least one hydrogen of a compound.

As used herein, when a definition is not otherwise provided, the term "hetero" may refer to one selected from N, O, S, and P.

As used herein, when a definition is not otherwise provided, the term "alkyl group" may refer to "a saturated alkyl group" without any alkenyl group or alkynyl group; or "an unsaturated alkyl group" including at least one alkenyl group or alkynyl group. The term "alkenyl group" may refer to a substituent having at least one carbon-carbon double bond of at least two carbons, and the term "alkyne group" may refer to a substituent having at least one carbon-carbon triple bond of at least two carbons. The alkyl group may be a branched, linear, or cyclic alkyl group.

The alkyl group may be a C1 to C20 alkyl group, for example, a C1 to C6 lower alkyl group, a C7 to C10 medium-sized alkyl group, or a C11 to C20 higher alkyl group.

For example, a C1 to C4 alkyl group may have 1 to 4 carbon atoms in an alkyl chain and may be selected from methyl, ethyl, propyl, iso-propyl, n-butyl, iso-butyl, sec-butyl, and t-butyl.

Examples of the alkyl group may be a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, or the like.

The term "aryl group" may refer to a cyclic substituent including all elements having a p-orbital which form conjugation and may refer to a monocyclic or fused ring (i.e., a plurality of rings sharing adjacent pairs of carbon atoms).

The substituted or unsubstituted C6 to C30 aryl group may be, for example, a substituted or unsubstituted phenyl group, a substituted or unsubstituted naphthyl group, a substituted or unsubstituted anthracenyl group, a substituted or unsubstituted phenanthryl group, a substituted or unsubstituted naphthacenyl group, a substituted or unsubstituted pyrenyl group, a substituted or unsubstituted biphenylyl group, a substituted or unsubstituted p-terphenyl group, a substituted or unsubstituted m-terphenyl group, a substituted or unsubstituted chrysenyl group, a substituted or unsubstituted triphenylenyl group, a substituted or unsubstituted perylenyl group, a substituted or unsubstituted indenyl group, or a combination thereof, as examples.

As used herein, when a definition is not otherwise provided, the term "copolymerization" may refer to block copolymerization, random copolymerization, graft copolymerization, or alternating copolymerization, and the term "copolymer" may refer to a block copolymer, a random copolymer, a graft copolymer, or an alternating copolymer.

In an embodiment, a binder composition for a rechargeable lithium battery includes a semi-interpenetrating polymer network (semi-IPN) including a copolymer including a repeating unit represented by the following Chemical Formula 1 and a repeating unit represented by the following Chemical Formula 2 and polyacrylamide, and polyalkylene glycol.

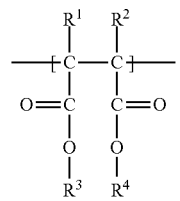

[Chemical Formula 1]

In the above Chemical Formula 1, $R^1$ and $R^2$ are the same or different and are independently selected from hydrogen, or a substituted or unsubstituted C1 to C10 alkyl group, and $R^3$ and $R^4$ are an alkali metal.

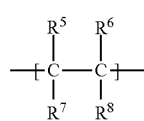

[Chemical Formula 2]

In the above Chemical Formula 2, $R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

The semi-interpenetrating polymer network may have strong and tough characteristics and simultaneously may have excellent flexibility. The binder composition including the same may control expansion of an active material effectively, and may have improved adherence and stability with an electrolyte solution. In addition, the binder composition may be used with an aqueous solvent and thus may be environment-friendly. A rechargeable lithium battery including the binder composition may provide high capacity and excellent initial efficiency, charge and discharge characteristics, and cycle-life characteristics.

The repeating unit represented by the above Chemical Formula 1 may be derived from a cyclic unsaturated acid anhydride monomer such as maleic anhydride, or the like. The copolymer may be dissolved in an aqueous solvent due to the repeating unit represented by the above Chemical Formula 1.

In the above Chemical Formula 1, $R^3$ and $R^4$ may be an alkali metal, and, for example, may be lithium, sodium, potassium, rubidium, cesium, or the like. For example, $R^3$ and $R^4$ may be lithium. In this way, by using the copolymer having a structure where an alkali metal is the substituent at the $R^3$ and $R^4$ positions in the above Chemical Formula 1, the initial efficiency of a rechargeable lithium battery including the same may be improved.

The repeating unit represented by the above Chemical Formula 1 may be included in an amount of about 40 mol % to about 90 mol % based on the total amount of the copolymer. For example, the repeating unit may be included in an amount of about 50 mol % to about 90 mol %, or about 50 mol % to about 80 mol %. The copolymer and the binder composition including the same may be dissolved in an aqueous solvent desirably, and flexibility and adherence may be ensured.

The repeating unit represented by the above Chemical Formula 2 may be derived from an olefin-based monomer, an aromatic vinyl monomer, an alkyl vinyl ether monomer, or the like.

The olefin-based monomer may be, for example ethylene, propylene, butylene, isobutylene, 1-heptene, 1-decene, 1-octadecene, or the like, and the aromatic vinyl monomer may be styrene, o-ethyl styrene, m-ethyl styrene, p-ethyl styrene, α-methyl styrene, or the like. The alkyl vinyl ether monomer may be methylvinylether, ethylvinylether, propylvinylether, butylvinylether, or the like. These may be used singularly or as a mixture thereof.

The repeating unit represented by the above Chemical Formula 2 may be included in an amount of about 10 mol % to about 60 mol % based on the total amount of the copolymer. For example, the repeating unit may be included in an amount of about 10 mol % to about 50 mol %, or about 20 mol % to about 50 mol %. Within the above range, the copolymer and the binder composition including the same may have excellent flexibility, may be may be dissolved in an aqueous solvent, and may control expansion of an active material.

The copolymer forms a semi-interpenetrating network structure with polyacrylamide. The binder composition includes a semi-interpenetrating polymer network (semi-IPN), and the semi-interpenetrating polymer network includes the above-described copolymer and polyacrylamide.

The term "interpenetrating polymer network" (IPN) refers to a network of heterogeneous polymers combined without a covalent bond. The term "semi-interpenetrating polymer network" (semi-IPN) refers to a network structure of a linear polymer and a cross-linking polymer.

Such a semi-interpenetrating polymer network may include two kinds of polymers in a chain shape to form a network structure, and may have strength and toughness characteristics and excellent flexibility compared with a general copolymer. Accordingly, the binder composition including the semi-interpenetrating polymer network may effectively control the expansion of an active material.

In the semi-interpenetrating polymer network, a mole ratio of the copolymer to the polyacrylamide may range from about 1:9 to about 5:5. For example, the mole ratio may range from about 2:8 to about 5:5, or about 2:8 to about 4:6.

The polyacrylamide may be included in an amount of about 50 mol % to about 90 mol % based on the total amount of the semi-interpenetrating polymer network. For example, the polyacrylamide may be included in an amount of about 50 mol % to about 80 mol %, or about 60 mol % to about 80 mol %.

In this case, the semi-interpenetrating polymer network may ensure excellent adherence and flexibility and thus, the binder composition may effectively control the expansion of an active material.

The polyalkylene glycol in the binder composition may help to reduce cracks or bending of a binder layer when the binder composition is coated and then dried, and may improve a loading level of an electrode by improving a density of a wet film. Adherence with an active material may be maintained for a long time.

The polyalkylene glycol may include, for example, polymethylene glycol, polyethylene glycol, polypropylene glycol, polybutylene glycol, polyisobutylene glycol, and the like.

The weight-average molecular weight of the polyalkylene glycol may range from about 400 g/mol to about 10,000 g/mol. For example, the weight-average molecular weight may range from about 400 g/mol to about 9,000 g/mol, or about 400 g/mol to about 8,000 g/mol.

The binder composition may include about 50 mol % to about 95 mol % of the semi-interpenetrating polymer network. For example, the semi-interpenetrating polymer network may be included in an amount of about 60 mol % to about 95 mol %, or about 70 mol % to about 95 mol %.

The binder composition may include about 5 mol % to about 50 mol %, or, for example, about 5 mol % to about 40 mol %, or about 5 mol % to about 30 mol % of polyalkylene glycol. The binder composition may effectively control expansion of an active material and may improve cracks or bending problems of a binder layer during drying of the binder, and may improve a loading level of an electrode by improving a density of a coating layer for an active material layer before drying.

The binder composition may further include a free lithium ion ($Li^+$). A rechargeable lithium battery including the binder composition may have improved charge and discharge characteristics.

The free lithium ion may be included in an amount of about 1 mol % to about 10 mol % based on the sum of the copolymer and the polyacrylamide. For example, the free lithium ion may be included in an amount of about 1 mol % to about 9 mol %, about 1 mol % to about 8 mol %, or about 1 mol % to about 7 mol %. Charge and discharge characteristics of a battery may be effectively improved.

The binder composition may include a solvent in addition to the copolymer and the free lithium ion. The solvent may be an organic solvent or an aqueous solvent. The binder composition may be used with an aqueous solvent and may be environmentally friendly.

The binder composition may have a pH of about 8 to about 11. For example, the binder composition may have pH of about 8.5 to about 10.5.

The viscosity of the binder composition may range from about 1,000 cps to about 100,000 cps. For example, the viscosity may range from about 1,000 cps to about 50,000 cps, about 1,000 cps to about 40,000 cps, about 1,000 cps to about 30,000 cps, about 1,000 cps to about 20,000 cps, about 1,000 cps to about 10,000 cps, or about 1,000 cps to about 9,000 cps.

In another embodiment, a method of preparing a binder composition for a rechargeable lithium battery includes adding a copolymer of at least one monomer selected from an olefin-based monomer, an aromatic vinyl monomer, and an alkyl vinyl ether monomer, and a cyclic unsaturated acid anhydride monomer, and polyalkylene glycol to a solvent; adding to an alkali metal-containing compound to the resultant solution, and adding an acrylamide monomer to the resultant solution to perform polymerization and form a semi-interpenetrating network structure of the copolymer and polyacrylamide.

The binder composition prepared by the above method may effectively control expansion of an active material, and may have improved adherence and stability with an electrolyte solution. The binder composition may use an aqueous solvent and may be environmentally friendly. In addition, a rechargeable lithium battery including the binder composition may have high capacity and excellent initial efficiency, charge and discharge characteristics and cycle-life characteristics.

The cyclic unsaturated acid anhydride monomer may be represented by the following Chemical Formula 3.

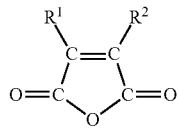

[Chemical Formula 3]

In the above Chemical Formula 3, $R^1$ and $R^2$ may be the same or different and may be independently selected from hydrogen or a substituted or unsubstituted C1 to C10 alkyl group.

The cyclic unsaturated acid anhydride monomer may be, for example maleic anhydride.

The amount of the cyclic unsaturated acid anhydride monomer may range from about 40 mol % to about 90 mol % based on the total amount of the copolymer. For example, the amount may range from about 40 mol % to about 80 mol %, or about 50 mol % to about 80 mol %. The copolymer and the binder composition including the same may be desirably dissolved in an aqueous solvent and flexibility and adherence may be ensured.

The amount of the at least one monomer selected from the olefin-based monomer, aromatic vinyl monomer, and alkyl vinyl ether monomer may range from about 10 mol % to about 60 mol % based on the total amount of the copolymer. For example, the amount may range from about 20 mol % to about 50 mol %, or about 20 mol % to about 40 mol %. Within the above range, the copolymer and the binder composition including the same may have excellent flexibility, may be may be dissolved in an aqueous solvent, and may control expansion of an active material.

The olefin-based monomer, aromatic vinyl monomer, and alkyl vinyl ether monomer are the same as described above.

The polyalkylene glycol may be added in an amount of about 5 mol % to about 50 mol % based on the sum of the copolymer, the polyacrylamide, and polyalkylene glycol. For example, the polyalkylene glycol may be added in an amount of about 5 mol % to about 40 mol %, or about 5 mol % to about 30 mol %. The binder composition may exhibit reduced cracks or bending during drying, and the binder composition may improve a loading level of an electrode by improving a density of a wet film.

The polyalkylene glycol is the same as described above.

When adding the alkali metal-containing compound to the solution, the alkali metal-containing compound may be included in an amount of about 28 parts by weight to about 34 parts by weight based on 100 parts by weight of the copolymer.

The alkali metal of the alkali metal-containing compound, may be, for example, lithium, sodium, potassium, rubidium, cesium, or the like. For example, the alkali metal may be lithium. The alkali metal-containing compound may be an alkali metal hydroxide, an alkali metal salt, or the like.

By adding the alkali metal-containing compound to the copolymer, the copolymer may include a dicarboxyl repeating unit substituted with an alkali metal, as in Chemical Formula 1. Thereby, initial efficiency of a rechargeable lithium battery may be improved.

In the interpenetrating network structure, the mole ratio of the copolymer to the polyacrylamide may range from about 1:9 to about 5:5. For example, the mole ratio may range from about 2:8 to about 5:5 or about 2:8 to about 4:6. The polyacrylamide may be included in an amount of about 50 mol % to about 90 mol % based on the total amount of the semi-interpenetrating polymer network. For example, the polyacrylamide may be included in an amount of about 50 mol % to about 80 mol %, or about 60 mol % to about 80 mol %. In this case, the semi-interpenetrating polymer network may ensure excellent adherence and flexibility, and thereby, the binder composition may effectively control expansion of an active material.

The semi-interpenetrating network structure may be formed by any suitable method. In one implementation, a first polymer may be primarily synthesized and swelled, then a monomer of a second polymer, a cross-linking agent, an initiator, and the like may be added, and the second polymer may be synthesized in the presence of the first polymer. In another implementation, a first polymer and a second polymer may be synthesized according to a different mechanism from each other, a monomer or prepolymer of the first polymer, a monomer or prepolymer of the second polymer, a cross-linking agent, initiator, and the like may be mixed to perform cross-linking polymerization of the first polymer and the second polymer simultaneously and to form the semi-interpenetrating network structure.

The manufacturing method according to one implementation may provide the semi-interpenetrating network structure by adding an acrylamide monomer and polymerizing the same in the presence of the copolymer.

In the manufacturing method, a cross-linking agent, a polymerization initiator, or the like may be added with the acrylamide monomer.

The polymerization initiator may include ammonium persulfate, sodium persulfate, potassium persulfate, hydrogen peroxide, 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), ascorbic acid, benzoyl peroxide, dibenzoyl peroxide, lauryl peroxide, ditertiarybutyl peroxide, or the like.

The manufacturing method may further include adding a lithium-containing compound after forming the semi-interpenetrating network structure. The binder composition may further include a free lithium ion ($Li^+$). A rechargeable lithium battery including the binder composition may have improved charge and discharge characteristics.

The lithium-containing compound may be added such that a content of the lithium ion is about 1 mol % to about 10 mol % based on the sum of the copolymer and the polyacrylamide. For example, the lithium-containing compound may be added such that a content of the lithium ion is about 1 mol % to about 9 mol %, about 1 mol % to about 8 mol %, or about 1 mol % to about 7 mol %. Charge and discharge characteristics of a battery may be effectively improved.

In another embodiment, a rechargeable lithium battery including the above-described binder composition is provided. For example, the rechargeable lithium battery may include electrodes and an electrolyte solution. The electrode includes a current collector and an active material layer positioned on the current collector. The active material layer includes an active material and the above-described binder composition.

The electrode active material may include a silicon-based compound such as Si, $SiO_x$, a Si—C composite, a Si-Q alloy, and the like, graphite, or a combination thereof. In $SiO_x$, x may be in the range of $0<x<2$, and in the Si-Q alloy, Q may be an alkali metal, an alkaline-earth metal, a Group 13 to 16 element, a transition element, a rare earth element, or a combination thereof, but is not Si.

When the negative active material is the silicon-based compound, a battery of high-capacity may be realized. For example, the battery may have a capacity of about 500 mAh/g to about 700 mAh/g.

However, the silicon-based negative active material undergoes volume expansion as a cycle goes, and a cycle-life of a general battery may be deteriorated. When the silicon-based active material is used with the above-described binder composition, on the other hand, the binder composition may effectively control the volume expansion of the silicon-based negative active material, and cycle-life characteristics of a battery may be improved.

In addition, the negative active material may include a combination of the silicon-based compound and graphite. In this case, a high-capacity and high power battery may be realized.

The negative active material may include about 10 wt % to about 90 wt % of graphite. For example, the negative active material may include about 10 wt % to about 80 wt %, about 20 wt % to about 80 wt %, or about 30 wt % to about 60 wt % of graphite. In this case, a high-capacity and high power battery may be realized.

A loading level of the electrode may range from about 4.5 g/cm² to about 10 g/cm². For example, the loading level may range from about 4.5 g/cm² to about 9 g/cm², or about 4.5 g/cm² to about 8 g/cm². The term "loading level of the electrode" refers to an amount of an active material per unit area of an electrode. The above-described binder composition may be appropriate for an electrode having the loading level within the range.

The electrode may include a positive electrode and a negative electrode. The binder composition according to one embodiment may be used in either the positive electrode or the negative electrode.

According to an implementation, the binder composition may be applied to the negative electrode.

The rechargeable lithium battery is described referring to FIG. 1. FIG. 1 illustrates a schematic view showing a structure of a rechargeable lithium battery according to an embodiment.

Referring to FIG. 1, the rechargeable lithium battery 100 according to this embodiment is a cylindrical battery that includes a negative electrode 112, a positive electrode 114, a separator 113 interposed between the negative electrode 112 and positive electrode 114, and an electrolyte (not shown) impregnating the negative electrode 112, the positive electrode 114, and separator 113, a battery case 120, and a sealing member 140 sealing the battery case 120. The rechargeable lithium battery 100 may be manufactured by sequentially stacking the negative electrode 112, separator 113, and positive electrode 114, and spiral-winding them, and housing the wound resultant in the battery case 120.

The negative electrode 112 may include a current collector and a negative active material layer formed on the current collector.

The current collector may include a copper foil, a nickel foil, a stainless steel foil, a titanium foil, a nickel foam, a copper foam, a polymer substrate coated with a conductive metal, or a combination thereof.

The negative active material layer includes a negative active material, the binder composition, and optionally a conductive material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may be a carbon material, and may be any generally-used carbon-based negative active material in a rechargeable lithium ion battery. Examples thereof may include crystalline carbon, amorphous carbon, or a combination thereof. Examples of the crystalline carbon may be a graphite such as a shapeless, sheet-shaped, flake, spherical shaped or fiber-shaped natural graphite or artificial graphite, and examples of the amorphous carbon may be soft carbon or hard carbon, a mesophase pitch carbonized product, fired cokes, or the like.

The lithium metal alloy may include an alloy of lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may be Si, $SiO_x$ ($0<x<2$), a Si—C composite, a Si-Q alloy (wherein Q is an alkali metal, an alkaline-earth metal, Group 13 to 16 elements, a transition metal, a rare earth element, or a combination thereof, and is not Si), Sn, $SnO_2$, a Sn—C composite, Sn—R (wherein R is an alkali metal, an alkaline-earth metal, a Group 13 to 16 element, a transition metal, a rare earth element, or a combination thereof, and is not Sn), and the like. Specific examples of the Q and R may be Mg, Ca, Sr, Ba, Ra, Sc, Y, Ti, Zr, Hf, V, Nb, Ta, Cr, Mo, W, Tc, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, or the like.

The binder composition is the same as described above, and descriptions thereof are not repeated.

The conductive material may improve the electrical conductivity of the electrode. Any suitable electrically conductive material that does not cause a chemical change may be used as the conductive material. Examples thereof include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, and the like; a conductive polymer such as a polyphenylene derivative or the like; or a mixture thereof.

The positive electrode 114 includes a current collector and a positive active material layer formed on the current collector.

The current collector may be Al, as an example.

The positive active material layer may include a positive active material, the binder composition, and, optionally, a conductive material.

The positive active material may include lithiated intercalation compounds that reversibly intercalate and deintercalate lithium ions. For example, at least one lithium metal composite oxide of lithium and a metal of cobalt, manganese, nickel, or a combination thereof may be used. Specific examples thereof include a compound represented by one of the following chemical formulae. $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may include the positive active material with a coating layer, or a compound of the active material and the active material coated with the coating layer. The coating layer may include a coating element compound of an oxide of a coating element, a hydroxide of a coating element, an oxyhydroxide of a coating element, an oxycarbonate of a coating element, or a hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any suitable process (e.g., spray coating, dipping), as long as it does not causes any side effects with respect to the properties of the positive active material.

The binder composition may be the above-described binder composition, or a generally-used binder.

Examples of the generally-used binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves the electrical conductivity of the electrode. Any suitable electrically conductive material that does not cause a chemical change may be used. Examples thereof include natural graphite, artificial graphite, carbon black, acetylene black, ketjen black, carbon fiber, copper, nickel, aluminum, silver, or the like, a metal powder, a metal fiber, or the like, and one or more kinds of a conductive material such as a polyphenylene derivative or the like may be mixed.

The negative electrode 112 and the positive electrode 114 may be manufactured by mixing each active material, a conductive material, and a binder in a solvent to prepare an active material composition, and coating the composition on a current collector. The solvent may be N-methylpyrrolidone or water but is not limited thereto.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran or the like. The ketone-based solvent may include cyclohexanone, or the like. The alcohol-based solvent may include ethanol, isopropyl alcohol, or the like. The aprotic solvent may include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, its mixture ratio can be controlled in accordance with desirable performance of a battery.

The carbonate-based solvent may be prepared by mixing a cyclic carbonate and a linear carbonate. The cyclic carbonate and the linear carbonate may be mixed together in a volume ratio of about 1:1 to about 1:9, which may enhance the performance of an electrolyte.

The non-aqueous organic solvent may include an aromatic hydrocarbon-based organic solvent as well as the carbonate based solvent. The carbonate-based solvent and the aromatic hydrocarbon-based organic solvent may be mixed together in a volume ratio of about 1:1 to about 30:1.

The aromatic hydrocarbon-based organic solvent may be an aromatic hydrocarbon-based compound represented by the following Chemical Formula 4.

[Chemical Formula 4]

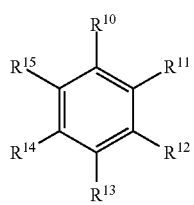

In the above Chemical Formula 4, $R^{10}$ to $R^{15}$ may be the same or different and may be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound represented by the following Chemical Formula 5 in order to improve cycle-life of a battery.

[Chemical Formula 5]

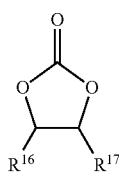

In the above Chemical Formula 2, $R^{16}$ and $R^{17}$ are the same or different and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R^{16}$ and $R^{17}$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The use amounts of additives for improving the cycle life may be adjusted within an appropriate range.

The lithium salt is dissolved in the non-aqueous solvent, supplies lithium ions in a rechargeable lithium battery, basically operates the rechargeable lithium battery, and improves lithium ion transfer between positive and negative electrodes. The lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), or a combination thereof. The lithium salt may be used in a concentration of about 0.1M to about 2.0M. When the lithium salt is included at the above concentration range, an electrolyte may have excellent performance and lithium ion mobility due to optimal electrolyte conductivity and viscosity.

A separator may be present between the positive electrode and negative electrode depending on a kind of a rechargeable lithium battery. Such a separator may include polyethylene, polypropylene, polyvinylidene fluoride, or a multilayer thereof, for example, a mixed multilayer such as a polyethylene/polypropylene double-layered separator, polyethylene/polypropylene/polyethylene triple-layered separator, polypropylene/polyethylene/polypropylene triple-layered separator, and the like.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Synthesis Example 1

Synthesis of Binder Composition 390 g of deionized water, 25 g of isobutylene-co-maleic anhydride, and 10 g of polyethylene glycol were put in a 2 L reactor having a heater, a cooler, and an agitator, an aqueous solution prepared by dissolving 8.0 g of lithium hydroxide in 80 g of deionized water at room temperature was slowly added thereto, and the mixture was agitated for 10 minutes. The reactor was heated up to 80° C. under nitrogen atmosphere and maintained for 3 hours. Subsequently, a solution prepared by dissolving 0.125 g of ammonium persulfate in 10 g of deionized water was added to the resultant, the mixture was maintained for 20 minutes, and an aqueous solution prepared by dissolving 65 g of acrylamide in 180 g of deionized water was added thereto in a dropwise fashion for 2 hours. The mixture was reacted for 1 hour and cooled down to less than or equal to 40° C., an aqueous solution prepared by dissolving lithium 2.9 g of hydroxide in 20 g of deionized water was added thereto in a dropwise fashion for 10 minutes, the mixture was packed, obtaining a binder having a solid content of 15.0 wt %, pH 9.8, and viscosity of 5,000 cps. The binder included a semi-interpenetrating polymer network including a copolymer including a repeating unit represented by the following Chemical Formula 1 and a repeating unit represented by the following Chemical Formula 2 and polyacrylamide, and polyalkylene glycol, and included free lithium ion.

[Chemical Formula 1]

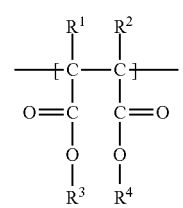

In the above Chemical Formula 1, $R^1$ and $R^2$ are hydrogen, and $R^3$ and $R^4$ are Li.

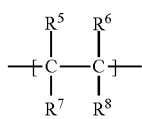

[Chemical Formula 2]

In the above Chemical Formula 2, $R^5$ and $R^7$ are hydrogen, and $R^6$ and $R^8$ are $CH_3$.

The repeating unit represented by the above Chemical Formula 1 was included in an amount of 40 mol % based on the total amount of the copolymer, and the repeating unit represented by the above Chemical Formula 2 was included in an amount of 60 mol % based on the total amount of the copolymer. Furthermore, in the semi-interpenetrating polymer network, a mole ratio of the copolymer to the polyacrylamide was 3:7. The amount of the semi-interpenetrating polymer was 90 mol % and that of polyalkylene glycol was 10 mole % in the binder composition.

The weight-average molecular weight of the polyalkylene glycol was 3000 g/mol, and the amount of free lithium ion was 6.6 mol %.

Evaluation Example 1

Spectroscopy Analysis (IR) of Binder

Figure 2:
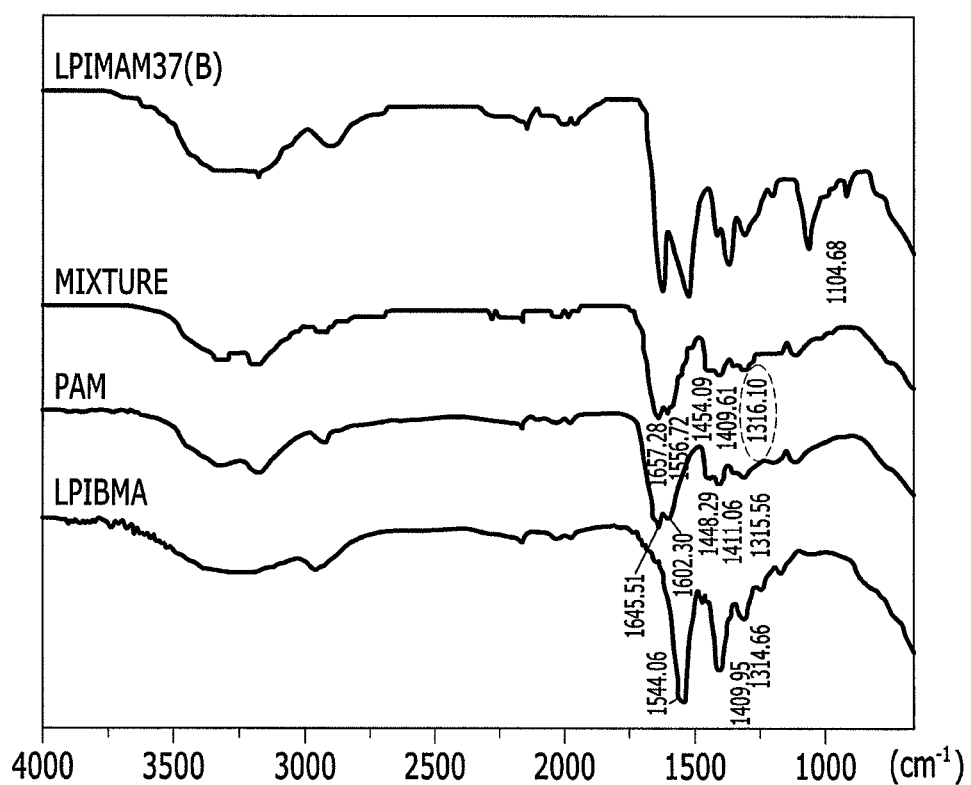
FIG. 2 illustrates an infrared spectroscopy graph (IR) showing the binder, and the like of Preparation Example 1.

FIG. 2 illustrates a spectroscopy analysis (IR) graph of four kinds of compounds: a poly isobutylene-co-maleic anhydride lithium salt (LPIBMA), polyacrylamide (PAM), a mixture of LPIBA and PAM, and a binder having a semi-interpenetrating polymer network (LPIMAM37(B)) according to Preparation Example 1.

Referring to a top graph 1 in FIG. 2, an IR peak of the binder (LPIMAM37(B)) according to Preparation Example 1, an amide III peak shifted from 1314 $cm^{-1}$ to 1349 $cm^{-1}$ and 1322 $cm^{-1}$. This may be caused by a molecular interaction between a functional group of the LPIBMA and an amide group of the PAM. The peak shift may be interpreted as showing that the isobutylene-co-maleic anhydride lithium salt and the polyacrylamide form a semi-interpenetrating network structure.

In addition, a peak at 1100 $cm^{-1}$ due to C—O stretching of polyethylene glycol was found.

Evaluation Example 2

Thermogravimetric Analysis (TGA)

Figure 3:
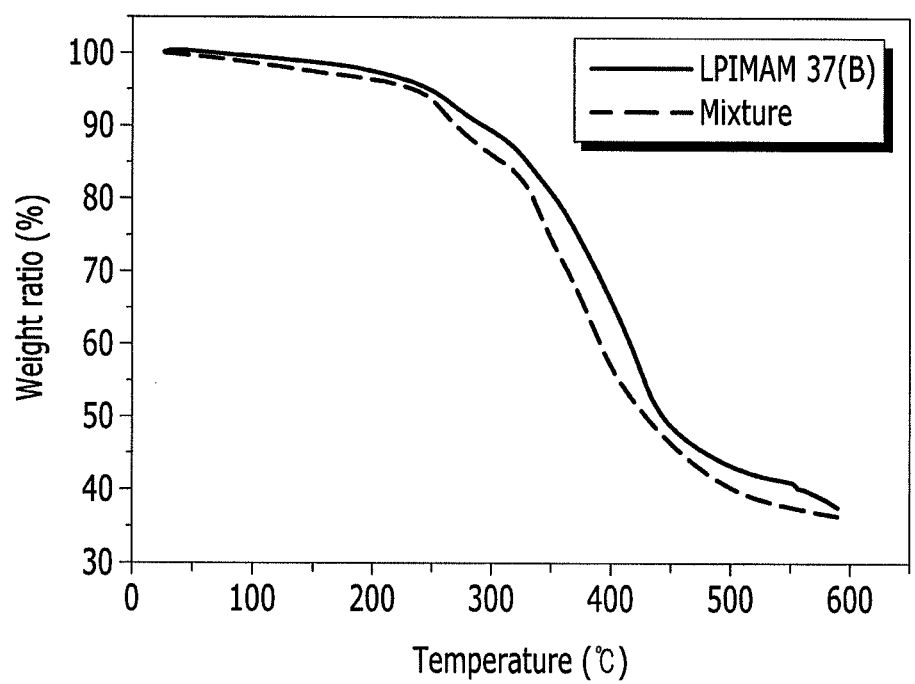
FIG. 3 illustrates a thermogravimetric analysis graph showing the binder, and the like of Preparation Example 1.

Thermogravimetric analysis of a mixture of LPIBA and PAM and a binder (LPIMAM37(B)) synthesized according to Preparation Example 1 was performed, and the results are provided in FIG. 3. As shown in FIG. 3, the binder according to Preparation Example 1 showed improved thermal resistance compared with the simple mixture of two polymers.

Examples and Comparative Examples

Manufacture of Rechargeable Lithium Battery Cell

A negative active material slurry was prepared by mixing each component in the amounts in water provided in the following Table 1. The negative active material slurry was coated onto a copper foil, dried at 110° C. to evaporate water, and compressed, manufacturing a negative electrode. The negative electrode was made into a 16 mm disk. Each negative electrode according to the Examples and Comparative Examples was loaded according to the load levels provided in the following Table 2.

A positive electrode was manufactured including mixing an active material ($LiNi_{0.6}CO_{0.2}Mn_{0.2}O_2$), a conductive material (Denka black), and a binder (polyvinylidene fluoride) in a weight ratio of 94:3:3 in N-methylpyrrolidone to prepare slurry. The positive electrode was formed into a 14 mm disk.

Using a polypropylene separator and an electrolyte solution prepared by mixing ethylene carbonate (EC), diethyl carbonate (DEC), and fluoro ethylene carbonate (FEC) in a volume ratio of 5:70:25 and adding $LiPF_6$ in a concentration of 1.5 mol/L in the mixed solvent, and these electrodes, a rechargeable lithium battery cell was fabricated.

TABLE 1

|  |  | Examples | | Comparative Examples | | | |
|---|---|---|---|---|---|---|---|
|  |  | 1 | 2 | 1 | 2 | 3 | 4 |
| Active material | Silicon-based Alloy (v6 from 3M) | 45.5 | 45.5 | 45.5 | 45.5 | 45.5 | 45.5 |
|  | Graphite | 45.5 | 45.5 | 45.5 | 45.5 | 45.5 | 45.5 |
| Conductive material | Ketjen black | 2 | 1 | 1 | 1 | 1 | 1 |
| Binder | Synthesis Example 1 | 8 | 8 |  |  |  |  |
|  | LPIBMA |  |  | 8 |  |  |  |
|  | SBR |  |  |  |  | 4 | 1.5 |
|  | CMC |  |  |  |  | 4 | 1.5 |
|  | PAI |  |  |  | 8 |  |  |

Each component in Table 1 was used as a unit of wt %.
Each component provided in Table 1 is illustrated as follows.

Active Material

A silicon-based active material, V6 made by 3M was used as the alloy, and MC20 made by Mitsubishi Chemical Co. was used as graphite.

Conductive Material

KB600JD ketjen black made by Mitsubishi Chemical Co. was used.

Binder

LPIBMA is a poly isobutylene-co-maleic anhydride lithium salt, and SBR is a styrene butadiene rubber. CMC indicates carboxylmethyl cellulose, and PAI indicates polyamideimide.

Evaluation Example 1

Evaluation of Initial Efficiency

The rechargeable lithium battery cells according to Examples and Comparative Examples were charged and discharged at 0.1 C, then, charge capacity and discharge capacity of the rechargeable lithium battery cells were measured, a ratio of the discharge capacity relative to the charge capacity was calculated, and the results are provided in the following Table 2.

Evaluation Example 2

Evaluation of Cycle-Life Characteristics

A capacity ratio of capacity at 100 cycles relative to capacity at 1 cycle of the rechargeable lithium battery cells according to Examples and Comparative Examples was calculated, and the results are provided in the following Table 2.

TABLE 2

|  | Examples | | Comparative Examples | | | |
| --- | --- | --- | --- | --- | --- | --- |
|  | 1 | 2 | 1 | 2 | 3 | 4 |
| Initial efficiency (%) | 86 | 89 | 80 | 76 | — | — |
| Cycle-life characteristics (%) | 90 | 92 | 58 | 68 | — | — |
| Loading level (g/cm$^2$) | 5 | 5 | 5 | 5 | 5 | 5 |

As shown in Table 2, the rechargeable lithium battery cells according to Examples showed remarkably improved initial efficiency and cycle-life characteristics compared with the rechargeable lithium battery cells according to Comparative Examples.

By way of summation and review, recently, demand for a battery having high energy density increasingly has made a negative active material having high theoretical capacity density desirable. Accordingly, Si, Sn, and Ge alloyed with lithium, an oxide thereof, an alloy thereof have drawn attention.

In particular, a Si-based negative active material has very high charge capacity and is widely applied to a high-capacity battery. However, a Si-based negative active material may expand by about 300% to about 400% during charging and discharging. Thus, charge and discharge characteristics and cycle-life characteristics of a battery may be reduced.

Accordingly, research on a binder capable of effectively controlling expansion of the Si-based negative active material has been actively conducted. Particularly, research for a binder composition capable of effectively controlling expansion of the active material has been actively performed.

Embodiments provide a binder composition for a rechargeable lithium battery capable of effectively controlling expansion of an active material, having improved adherence and stability with an electrolyte solution, capable of increasing a loading level of an electrode, and reducing cracks or bending during drying.

Another embodiment provides a method of manufacturing the same.

Still another embodiment provides a rechargeable lithium battery having improved initial efficiency, charge and discharge characteristics, and cycle-life characteristics due to the binder composition.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. A binder composition for a rechargeable lithium battery, the binder composition comprising:
a semi-interpenetrating polymer network (semi-IPN) including:
a copolymer having a repeating unit represented by the following Chemical Formula 1 and a repeating unit represented by the following Chemical Formula 2, and
polyacrylamide, and
polyalkylene glycol

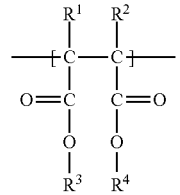

[Chemical Formula 1]

wherein,
$R^1$ and $R^2$ are the same or different and are independently selected from hydrogen, or a substituted or unsubstituted C1 to C10 alkyl group, and
$R^3$ and $R^4$ are an alkali metal, and

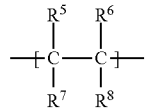

[Chemical Formula 2]

wherein,
$R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

2. The binder composition for a rechargeable lithium battery as claimed in claim 1, wherein:
the repeating unit represented by Chemical Formula 1 is included in an amount of about 40 mol % to about 90 mol % based on a total amount of the copolymer, and
the repeating unit represented by Chemical Formula 2 is included in an amount of about 10 mol % to about 60 mol % based on the total amount of the copolymer.

3. The binder composition for a rechargeable lithium battery as claimed in claim 1, wherein in the semi-interpenetrating polymer network, a mole ratio of the copolymer to the polyacrylamide ranges from about 1:9 to about 5:5.

4. The binder composition for a rechargeable lithium battery as claimed in claim 1, wherein the binder composition includes:
about 5 mol % to about 50 mol % of polyalkylene glycol, based on a sum of the copolymer, the polyacrylamide, and the polyalkylene glycol.

5. The binder composition for a rechargeable lithium battery as claimed in claim 1, wherein a weight-average molecular weight of the polyalkylene glycol ranges from about 400 g/mol to about 10,000 g/mol.

6. The binder composition for a rechargeable lithium battery as claimed in claim 1, wherein the binder composition further comprises a free lithium ion (Li$^+$).

7. The binder composition for a rechargeable lithium battery as claimed in claim 6, wherein the free lithium ion is included in an amount of about 1 mol % to about 10 mol % based on a sum of the copolymer and the polyacrylamide.

8. The binder composition for a rechargeable lithium battery as claimed in claim 1, wherein the binder composition has a pH of about 8 to about 11.

9. The binder composition for a rechargeable lithium battery as claimed in claim 1, wherein a viscosity of the binder composition ranges from about 10,000 cps to about 100,000 cps.

10. A rechargeable lithium battery, comprising:
an electrode including the binder composition as claimed in claim 1, and an electrode active material; and
an electrolyte.

11. The rechargeable lithium battery as claimed in claim 10, wherein the electrode active material includes a silicon-based compound, graphite, or a combination thereof.

12. The rechargeable lithium battery as claimed in claim 10, wherein the electrode active material includes about 10 wt % to about 90 wt % of graphite.

13. The rechargeable lithium battery as claimed in claim 10, wherein a loading level of the electrode ranges from about 4.5 g/cm² to about 10 g/cm².

14. A method of preparing a binder composition for a rechargeable lithium battery, the method comprising:
adding a copolymer of at least one monomer selected from an olefin-based monomer, an aromatic vinyl monomer, and an alkyl vinyl ether monomer and a cyclic unsaturated acid anhydride monomer, and polyalkylene glycol to a solvent;
adding an alkali metal-containing compound to the resultant solution; and
adding an acrylamide monomer to the resultant solution to form polyacrylamide by polymerization and form a semi-interpenetrating network structure of the copolymer and polyacrylamide, wherein:
the at least one monomer selected from an olefin-based monomer, an aromatic vinyl monomer, and an alkyl vinyl ether monomer and the cyclic unsaturated acid anhydride monomer are selected such that the copolymer has a repeating unit represented by the following Chemical Formula 1 and a repeating unit represented by the following Chemical Formula 2,

[Chemical Formula 1]

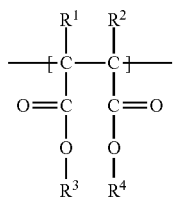

wherein,
$R^1$ and $R^2$ are the same or different and are independently selected from hydrogen, or a substituted or unsubstituted C1 to C10 alkyl group, and $R^3$ and $R^4$ are an alkali metal, and

[Chemical Formula 2]

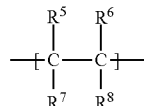

wherein,
$R^5$ to $R^8$ are the same or different, and are independently hydrogen, a substituted or unsubstituted C1 to C30 alkyl group, a substituted or unsubstituted C6 to C30 aryl group, or a substituted or unsubstituted C1 to C30 alkoxy group.

15. The method as claimed in claim 14, wherein:
the cyclic unsaturated acid anhydride monomer is included in an amount of 40 mol % to 90 mol % based on a total amount of the copolymer, and
the at least one monomer selected from the olefin-based monomer, aromatic vinyl monomer, and alkyl vinyl ether monomer is included in an amount of about 10 to about 60 mol % based on the total amount of the copolymer.

16. The method as claimed in claim 14, wherein the polyalkylene glycol is added in an amount of about 5 mol % to about 50 mol % based on a sum of the copolymer, the polyacrylamide, and polyalkylene glycol.

17. The method as claimed in claim 14, wherein, during adding the alkali metal-containing compound to the solution, the alkali metal-containing compound is included in an amount of about 28 parts by weight to about 34 parts by weight based on 100 parts by weight of the copolymer.

18. The method as claimed in claim 14, wherein a mole ratio of the copolymer to the polyacrylamide ranges from about 1:9 to about 5:5.

19. The method as claimed in claim 14, wherein the method further comprises, during performing polymerization and forming the semi-interpenetrating network structure after adding the acrylamide monomer to the solution, adding a polymerization initiator to the solution.

20. The method as claimed in claim 14, wherein the method further comprises, after forming the semi-interpenetrating network structure, adding a lithium-containing compound.

21. The method as claimed in claim 20, wherein, during adding the lithium-containing compound, the lithium-containing compound is added such that a content of a lithium ion is about 1 mol % to about 10 mol % based on a sum of the copolymer and the polyacrylamide.

* * * * *